United States Patent [19]

Toyomura

[11] 4,438,431
[45] Mar. 20, 1984

[54] ELECTRONIC DEVICE HAVING WARNING MEANS

[75] Inventor: Shigeru Toyomura, Kawasaki, Japan

[73] Assignee: Canon Kabushiki Kaisha, Tokyo, Japan

[21] Appl. No.: 262,959

[22] Filed: May 12, 1981

[30] Foreign Application Priority Data

May 16, 1980 [JP] Japan ................................. 55-65712

[51] Int. Cl.³ ............................................. G08B 21/00
[52] U.S. Cl. .................................... 340/663; 340/636;
364/709; 371/66
[58] Field of Search ............... 340/659, 663, 629, 636;
364/200 MS File, 900 MS File, 709; 371/66

[56] References Cited

U.S. PATENT DOCUMENTS

| | | | |
|---|---|---|---|
| 3,383,522 | 5/1968 | Apfelbeck et al. | 340/663 X |
| 3,679,965 | 7/1972 | Wilkinson | 340/663 X |
| 3,821,734 | 6/1974 | Herrliberg et al. | 340/629 X |
| 3,868,663 | 2/1975 | Ray | 340/629 X |
| 3,964,036 | 6/1976 | Adachi et al. | 340/629 X |
| 4,097,850 | 6/1978 | Conforti | 340/629 X |
| 4,099,068 | 7/1978 | Kobayashi et al. | 340/663 X |
| 4,245,150 | 1/1981 | Driscoll et al. | 340/663 X |

FOREIGN PATENT DOCUMENTS 2429244 1/1975 Fed. Rep. of Germany .

*Primary Examiner*—John W. Caldwell, Sr.
*Assistant Examiner*—Daniel Myer
*Attorney, Agent, or Firm*—Fitzpatrick, Cella, Harper & Scinto

[57] ABSTRACT

An electronic appliance provided with an output section to produce, as an output, input data introduced from an input section an operational result of the input data, and a power source section to supply electric power to the output section, wherein the appliance is further provided with a detection device for detecting abnormality in the output operation of the output section based on a decrease in the power supply from the power source section or an abnormality in the output operation of the output section based on the power decrease, thereby inhibiting data input from the input section when the decrease in the power or the abnormality is detected.

2 Claims, 2 Drawing Figures

ELECTRONIC DEVICE HAVING WARNING MEANS

BACKGROUND OF THE INVENTION

1. Field of the Invention

This invention relates to an electronic device provided with means for warning a voltage decrease in a power source section, or abnormal operation of an output section based on the voltage decrease in this power source section.

2. Description of the Prior Art

In an electronic appliance having a printing device incorporated therein and operated by a commercial a.c. power source or a battery such as, for example, an electronic desk calculator with printer, learning machine, a game machine, etc., it occurs from time to time that the printing device does not work regularly in spite of its operational section performing normal operation, when the power source capacity of the battery lowers on an output from the a.c. power source decreases for one reason or another.

In order to prevent such an abnormal operation of the printing device, conventional electronic appliances having a printing device therein are equipped with a meter (such as a voltmeter, an ammeter, etc.) to detect a power source capacity, etc., according to the meter indication of which the power source capacity, etc. is made known to a user.

According to the above-described method, however, it is difficult for the user of the electronic appliance having the printing device to pay constant attention to the meter during use, hence there would be danger if the user continues to operate the device without knowing that the power source capacity, etc., has lowered, and the use could obtain a wrong result which he would consider accurate. Such malfunctioning of the device inevitably would cause a great deal of damage to business, in particular to the banking and commercial businesses.

SUMMARY OF THE INVENTION

It is an object of the present invention to provide an electronic appliance provided with means for effectively warning of a decrease in the power supply voltage at the power source section, or any fluctuation caused by a voltage decrease.

It is another object of the present invention to provide an electronic appliance provided with a warning means of a simple construction.

It is still another object of the present invention to provide an electronic appliance capable of warning of an abnormality in the appliance without use of an exclusive output means therefor.

It is another object of the present invention to provide an electronic appliance, in which the warning occurs immediately.

DETAILED EXPLANATION OF THE PREFERRED EMBODIMENTS

Figure 1:
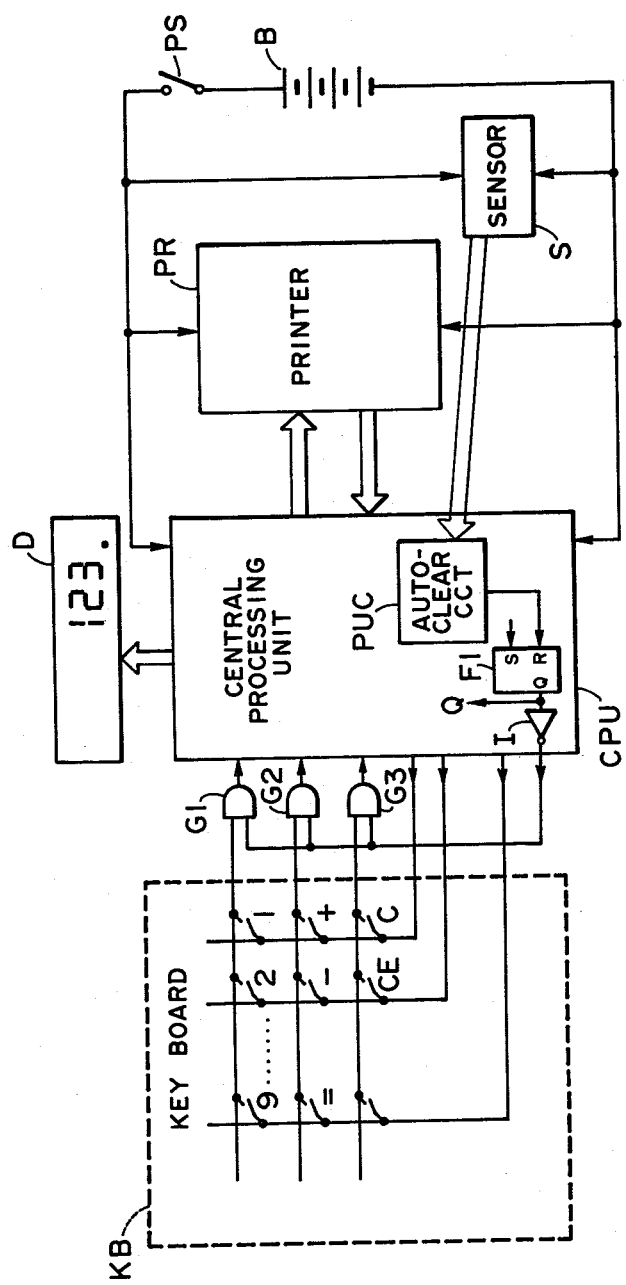
FIG. 1 is a block diagram showing a circuit structure of a desk calculator having a printer according to one embodiment of the present invention.

FIG. 1 shows an electronic desk calculator, as one embodiment of the electronic appliance according to the present invention, which is capable of detecting a capacity in a battery power source, making a warning display when the power source capacity lowers as a result of the detection, and inhibiting key-input.

In the drawing, KB designates a key board as an input section which is constructed with numerical value keys (1, 2, ..., 9), function keys (−, +, ..., =), clear keys (C, CE), etc., as illustrated. G1, G2 and G3 refer to AND gates to inhibit key input signals. CPU designates a circuit (central processing unit) for performing controls and operations of the overall electronic desk calculator having the printing device, which is constructed with a memory register; a circuit for producing an output key scanning signal to the key board KB, reading the key signal as operated, and discriminating a kind of the key operated; a circuit for executing the operations in accordance with a program, in which the operational modes of the key as operated has been memorized beforehand, and producing an operated result as an output; a flip-flop F1; an automatic clear circuit PUC connected to the flip-flop F1 to supply a reset signal; an inverter I; and so forth. A reference letter D designates a display device as an output means which displays numerical values, operational result, etc. by the controls performed in the operational section CPU, and is constructed with a liquid crystal display device, a fluorescent display tube, and so on. PR refers to a printing device as an output means which prints out numerical values, operational results, etc. by the controls done in the operational section CPU. B refers to a power source section to actuate the operational section CPU, the printing device PR, etc. In the illustrated embodiment, the power source consists of a battery. A commercial a.c. power source may, of course, be used. PS refers to a power source switch for connecting or disconnecting the power source f B. S refers to a detector for detecting an electric voltage of the power source B. The detector is connected in parallel with the power source B, and its output is forwarded to the CPU. This detector S is so adjusted that it may produce an output level "0" at the operational section when the electric capacitance in the power source B is sufficient, i.e., the printing device PR works regularly, and produce an output "1" when the electric capacitance of the power source B lowers to a degree, at which the printing device no longer operates regularly. Examples of such a detector S is illustrated in FIG. 1 of Japanese Utility Model Application Laid Open No. 121726/1979 having a laid-open date of Aug. 25, 1979, and FIG. 2 of Japanese Patent Application Laid-Open No. 33848/1976 having a laid-open date of Mar. 23, 1976.

In the following, explanations will be given as to the operation of the circuit of the construction as mentioned in the foregoing.

First of all, the power source switch PS is closed to supply electric current to the CPU, the printing device PR, and the detector S, whereby the auto-clear circuit PUC in the CPU is actuated, and the operational register, the flip-flop F1, etc. are reset to "0". This auto-clear circuit PUC has been well known in the art, hence detailed explanations thereof will be dispensed with. When the flip-flop F1 is reset, an output from the inverter I assumes a level "1", whereby the AND gates G1, G2 and G3 are opened, and the key-input operation becomes possible. When the key-input for the operation, e.g., 2×3=?, is performed, the operation is executed in the CPU, and an operational result of "2×, 3=, 6*", etc. is printed on a recording sheet by means of the printing device PR, while the result is displayed on the display device D.

If the electrical voltage of the power source B is sufficient, the output from the detector S is at the level "0", and the CPU does not work at all. However, during its use, the electrical voltage of the power source B lowers, and the output from the detector S assumes the level "1" at a certain threshold value, whereupon the output value is detected in the CPU to render the set input of the flip-flop F1 to be at the level "1" at first, and then the flip-flop F1 at the level "1". By this set signal, warning indications such as an ordinary operational result overflow, etc., are made in the display section. Also, when the flip-flop F1 is set at "1", the output from the inverter I assumes "0", whereby the AND gates G1, G2 and G3 are closed, and the key signal from the key board KB is inhibited, preventing entrance of an input signal into the CPU.

As mentioned in the foregoing, the electrical appliance of the present invention is capable of preventing erroneous printing due to its inhibiting of all the key-input signals relative to the operation when the electrical capacitance of the power source B lowers, whereby no printing based on the key input becomes possible thereafter, and, at the same time, it is capable of effectively warning of the decrease in the battery capacity to the operator without use of any special warning device.

Since a reset signal enters into the flip-flop F1 only at the time of when power is supplied, this key-input inhibition state can be released by opening the power source switch PS, exchanging the power source battery B with a fresh one, and thereafter closing the power source switch PS again. In this manner, the flip-flop F1 is reset at the level "0", and the key-input inhibition state is released.

Incidentally, when the warning display method is for "the operational result overflow warning" as is the case with "the operational result overflow", the key-input inhibition state can be cleared by the clear key C. In this case, the clear key is also inhibited from distinguishing between them. According to this embodiment, the AND gates G1, G2 and G3 are provided outside the CPU to inhibit the key-input signals. However, by formulating a program in such a manner that, if the programs in the CPU have been set by the flip-flop F1, the input of the key-inputs is not admitted, and the AND gates become unnecessary, so that all the operations within the CPU can be disposed of.

Figure 2:
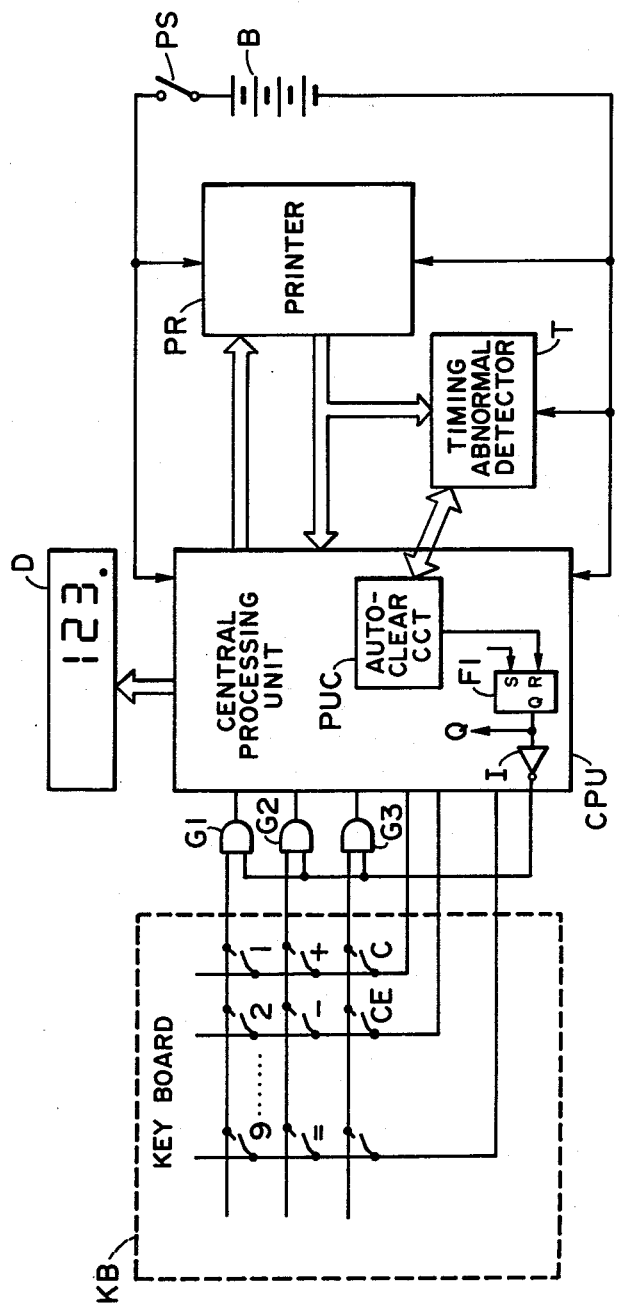
FIG. 2 is a block diagram showing a circuit structure of a desk calculator having a printer according to another embodiment of the present invention.

FIG. 2 illustrates the second embodiment of the present invention, wherein the electrical voltage of the power source is not directly detected, but an erroneous operation of the printing device is detected by a timing signal from the printing device to inhibit the key-input.

In the drawing, those components KB, CPU, D, PR, PS, B, G1, G2, G3, I and F1 have the same functions as those shown in FIG. 1. Although the printing device PR as the output means is not shown in the drawing, it has one or more character wheels, each having on its outer peripheral surface various characters and numerals inscribed therein, and with the device rotated by a motor, etc. (not shown). A timing signal to indicate the position of a character is generated with each rotation of the character wheels.

A reference letter T designates a timing abnormality detection circuit to detect whether the printing operation is abnormal or not by monitoring the timing signal from the printing device PR by the controls of the CPU. As soon as the power source voltage capacity lowers to reduce the number of revolutions of the motor, on account of which a pulse interval of the timing signal becomes larger than a predetermined value, the timing abnormality detection circuit T produces an output level of "1" to the CPU to intimate occurrence of the erroneous operation.

Incidentally, no erroneous printing takes place immediately upon increase in the pulse interval of the timing signal, but it is derived from various pulse levels which lower with a decrease in the power source capacity. In the illustrated embodiment, the timing abnormality detection circuit T detects the erroneous operation before the erroneous printing is done, and produces an output level of "1" to the CPU. An example of such a timing abnormality detection circuit is illustrated in FIG. 6 of the above-identified Japanese Utility Model Application Laid Open No. 121726/1979.

In another example of the printing device, different timing signals are produced as output, one for the normal printing operation and the other for the erroneous printing operation. In such a printing device, the timing abnormality detection circuit or timing abnormal detector T detects either of the timing signals and produces the output level of "1" to the CPU, and the mis-printed portion may be corrected after exchange of the battery.

By the detection of the timing signal generated from the printing device PR, it becomes possible to establish, more accurately in this device the threshold value of the power source capacity than in the device in which the power source capacity is directly detected. Further, a much more accurate result can be obtained when the warning is generated by a signal which indicates that erroneous printing has occurred.

In the following, explanations will be given as to the operations of the circuit in the above-described construction.

First of all, by closing the power source switch PS, the electric current is supplied to the CPU, printing device PR, timing abnormality detection circuit, and so on, whereby the auto-clear circuit PUC in the CPU is actuated, the flip-flop F1 is reset to the level "0", an output from the inverter I assumes a level "1", and the AND gates G1, G2 and G3 are opened. By the opening of the AND gates G1, G2 and G3, the key-input from the key board is received by the CPU, and the normal printing operation is conducted. Here, if a timing signal output different from the normal timing signal is produced by decrease in the power source capacity, this different signal is detected by the timing abnormality detection circuit T, and the output level "1" is produced in the CPU.

When the output level "1" of the timing abnormality detection circuit T is detected in the CPU, the display device D displays a warning thereon same as, for example, the operational result overflow, and sets the flip-flop F1 at the level "1". When the flip-flop F1 is set, the output from the inverter I assumes the level "0", the AND gates G1, G2 and G3 are closed, the key-input signal is inhibited, and no key operation is entered, whereby the erroneous printing is not done and the user is effectively advised of the need for exchange of the battery. To release this key input inhibition state, the power source switch should be turned off, a fresh battery is replaced, and the power source switch PS is again closed so that the auto-clear circuit PUC in the CPU is actuated to rest the flip-flop F1 at the level "0", thereby releasing the key-input inhibition. In the drawing, the AND gates G1, G2 and G3 and the timing discrimination circuit T are provided outside the CPU, although it is possible to incorporate these components within the CPU and construct the same with a single LSI.

It should be understood that the present invention is not limited to the above-described embodiments, but it may be so constructed that the printing device may be simultaneously stopped with the key-input inhibition. The electronic appliance according to the present invention may also be applied to various fields such as learning machines, game machines, and others. The output means includes not only the printing device, but also the display device.

What I claim is:

1. An electronic device for producing a warning comprising:

key input means for introducing data signals as input data into said electronic device, said key input means including a clear-key for introducing a clear-signal into said electronic device to clear the input data;

printing means for printing an output related to the input data in said key input means;

power source means for supplying electric power to said printing means;

detection means for detecting an output related to the electric power supplied from said power source means, and for generating a signal based on the detection; and means for inhibiting data input from said key input means into said printing means upon receipt of the detection signal from said detection means, wherein said inhibiting means includes a plurality of gate circuits which prevent said key input means from introducing data signals when said inhibiting means is receiving the detection signal from said detection means.

2. The electronic device according to claim 1, wherein said electronic device includes display means for displaying data related to the input data from said key input means.

* * * * *